(12) United States Patent
Weinstock

(10) Patent No.: US 11,381,723 B2
(45) Date of Patent: Jul. 5, 2022

(54) PLENOPTIC INTEGRAL IMAGING LIGHT FIELD, FULL-FOCUS, SINGLE-ELEMENT VOLUMETRIC CAPTURE LENS AND SYSTEM

(71) Applicant: SOLIDDD CORP., Brooklyn, NY (US)

(72) Inventor: Neal Weinstock, Brooklyn, NY (US)

(73) Assignee: SOLIDDD CORP., Brooklyn, NY (US)

( * ) Notice: Subject to any disclaimer, the term of this patent is extended or adjusted under 35 U.S.C. 154(b) by 277 days.

(21) Appl. No.: 16/712,425

(22) Filed: Dec. 12, 2019

(65) Prior Publication Data
US 2021/0185204 A1   Jun. 17, 2021

(51) Int. Cl.
| H04N 5/225 | (2006.01) |
| G02B 3/00 | (2006.01) |
| H04N 5/232 | (2006.01) |
| H04N 13/172 | (2018.01) |

(52) U.S. Cl.
CPC ....... H04N 5/22541 (2018.08); G02B 3/0056 (2013.01); H04N 5/23299 (2018.08); H04N 13/172 (2018.05)

(58) Field of Classification Search
CPC .......... H04N 5/22541; H04N 5/23299; H04N 13/172; H04N 5/2259; H04N 5/23212; H04N 5/232125; G02B 3/0056
See application file for complete search history.

(56) References Cited

U.S. PATENT DOCUMENTS

2018/0097867 A1\* 4/2018 Pang ............... H04N 19/44

FOREIGN PATENT DOCUMENTS

WO   2012138324 A1   10/2012

OTHER PUBLICATIONS

Ng et al, "Light Field Photography with a Hand-held Plenoptic Camera", Stanford Tech Report CTSR Feb. 2005, Feb. 1, 2005, 11 pages. Available at: https://graphics.stanford.edu/papers/lfcamera/lfcamera-150dpi.pdf. Last accessed Jun. 24, 2021.
Redaktion Photoscala, "Lytro Desktop 5 bringt erweiterte Bearbeitungsfunktionen fur Lichtfeldkamera Illum", Nov. 15, 2018, 8 pages. Available at: https://www.photoscala.de/2015/11/26/lytro-desktop-5-bringt-erweiterte-bearbeitungsfunktionen-fuer-lichtfeldkamera-illum/. Last accessed Jun. 24, 2021.
Lytro Illum User Manual, XP055446352, Aug. 5, 2015, pp. 6, 72-83. Available at: https://s3.amazonaws.com/lytro-corp-assets/manuals/english/illum_user_manual.pdf. Retrieved on Jan. 31, 2018.
Kolesar, Daniela, International Search Report for PCT Application Serial No. PCT/US2020/064012, dated Mar. 24, 2021 4 pages.

\* cited by examiner

*Primary Examiner* — Christopher K Peterson
(74) *Attorney, Agent, or Firm* — Ference & Associates LLC

(57) ABSTRACT

An apparatus and system for an image capture device that captures images utilizing a lens made of a plurality of lenslets that each capture an image. Utilizing information of the lenslets and range of view of the lenslets, the system can modify the image being captured to capture information chosen by a user and ignore other image information. For example, the system can chose a particular distance for object capture, pan/tilt/zoom information, focal length information, depth of field information, or the like. Other embodiments are described herein.

18 Claims, 6 Drawing Sheets

PLENOPTIC INTEGRAL IMAGING LIGHT FIELD, FULL-FOCUS, SINGLE-ELEMENT VOLUMETRIC CAPTURE LENS AND SYSTEM

FIELD OF THE INVENTION

The present invention relates generally to image capture systems, and, to volumetric capture systems, and, more particularly, to image capture device systems utilizing a lens made up of a plurality of lenslets in a plenoptic array that allow for capture of integral images.

BACKGROUND OF THE INVENTION

Image capture devices (e.g., film and digital cameras, information handling devices with integrated cameras, video-camera recorders, etc.) are routinely used to capture images for many different purposes. Some image capture devices are more complex than others. For example, image capture devices that are integral to portable information handling devices (e.g., smartphones, tablets, smart watches, etc.) or other information handling devices (e.g., laptop computers, personal computers, etc.) generally have fixed lenses and software that a user can access to manipulate the captured image. The software-based-modifications that the user can make when capturing the image using these devices are generally small in number. For example, the user may be able to use a digital zoom function, change exposure time, mimic different focal length effects, change the orientation of the image captured, and gradually more features as computing power increases. Generally, the lens and lens focal length, aperture, and other physical specifications of these cameras are fixed and unable to be changed, so that all image adjustments are made in software. More complex imaging features are attained by deploying multiple cameras, each with a fixed, multiple-element lens, and combining information from these separate cameras with software.

More traditional cameras, especially those used by professionals, feature little or no software image manipulations. They remain superior to smartphone cameras in that they feature larger sensors (or use film) for greater resolution images, and use larger lenses, all with multiple elements, that let in a great deal of light. Many of the effects achieved via software in smartphone, or other portable information handling device, cameras mimic the natural properties of images created by photographers using their choice of many different potential lenses with differing focal lengths, light sensitivity, and other characteristics. Software running on larger computer systems may be used after images have been captured to manipulate imagery in ways far beyond the capabilities of a smartphone or other information handling device.

A more recently pioneered type of image capture system is the light-field camera. Light-field systems deploy either many combination of lenses and sensors, or multiple lenses in front of a single sensor in what is a known as a plenoptic array, to capture three-dimensional information about the image in front of the lens or lenses. Typical light-field capture systems feature a microlens array in in front of a sensor, and one or more additional focusing lens elements stacked in front of the microlens array. Some available systems take numerous exposures at different focal distances and allow users to focus, with software, on different areas of a captured light field after the picture has been captured. Others aim to capture an autostereo 3D view of what the camera sees, but typically suffer from low apparent resolution and very noticeable diffraction and image distortion. They correct for these flaws, to some extent, with multiple lens elements that compromise the ability to capture volumetric information in other ways and make for a large, bulky and heavy system.

SUMMARY OF THE INVENTION

In accordance with the present invention, a method and system provides an image capture device that includes a plenoptic lens, or lens array, made of a plurality of light-directing beads or lenslets. The plenoptic lens is placed over and focused on a sensor or array of sensors, for example, an image sensor of an image capture device. When the processor of the image capture device directs the device to capture an image, the image is captured through the array of lenslets. Each lenslet can capture an integral image that is in full focus, with only this single lens element used. Additionally, since each lenslet captures an integral image, the user can provide different input to identify what information should be captured within an image captured by the image capture device. For example, the user can provide information related to a distance at which objects should be captured. With this information the system captures information from the lenslets that are "seeing" information at precisely that distance and ignores information from other focal distances. This is possible because the full-focus integral image attained by each lenslet in the array captures light from precisely known directions, while the spatial relationships of all the lenses in the array are also precisely understood; therefore there are infinite points of intersection between light rays captured by the lenslets, and those points can all be known. The number of these data points is limited only by the resolution of the sensor or sensor array used. The light field viewed by the camera is captured in full focus with accurate understanding of depth information with relation to the camera (Z-axis information) as well as the normally accurate X and Y coordinate data; capture of this three-axis information is commonly referred to as "volumetric" capture. Therefore, selections from the volumetric data set can be made to modify the information seen in the image, for example, in ways that would normally only be possible using mechanical components in traditional systems, for example, pan and tilt information. Even processes normally done in software, such as digital zoom, are performed by this system in a different and more accurate manner.

In summary, one aspect provides an apparatus, comprising: at least one sensor having an imaging plane; a plurality of light-directing lenslets arranged as a plenoptic lens or lens array, wherein the lens or lens array is located over the at least one sensor, wherein each of the plurality of light-directing lenslets focuses an image on the imaging plane of the at least one sensor; and a processor operatively coupled to at least one sensor that causes the apparatus to capture and manipulate the image seen through the lens.

A BRIEF DESCRIPTION OF THE DRAWINGS

DETAILED DESCRIPTION OF THE INVENTION

In accordance with the present invention, an embodiment provides a lens for an image capture device that allows for capturing of volumetric information within an image and, therefore, allows for many user selections with respect to the information that is captured by the image capture device. Additionally, since so much information is captured utilizing the lens, the system allows for more complex image editing of the resulting image. For example, the depth of field, focal length, pan, tilt, zoom, and the like, associated with the image can be modified. Full volumetric information about the scene captured allows creation of accurate autostereo 3D images, and also allows for actionable location data about all objects in the scene, to be used in many different applications. Additionally, this information can also be modified before the image is captured in order to manipulate and adjust images in infinite ways.

The lens is made up of a plurality of light-directing beads, also referred to as mini-lenses, microlenses, or lenslets. Additional details regarding the Foveal lens when used in both display and capture systems, and background information regarding the lenslets can be found in commonly owned U.S. patent application Ser. No. 16/436,343, filed Jun. 10, 2019, and titled "Near-Eye Foveal Display", which is a continuation-in-part of U.S. patent application Ser. No. 15/671,694, filed Aug. 8, 2017, and titled "Near-Eye Foveal Display", which is a continuation-in-part of U.S. patent application Ser. No. 15/594,029, filed May 12, 2017, and titled "Near-Eye Foveal Display", the contents of which are incorporated by reference herein.

The lenslets each capture an integral image that is in full focus. Since each lenslet is small, the lens or lens array includes a large number of lenslets. Thus, the resulting lens, or arrays of lenslets, is a high-resolution lens that is not found within conventional image capture device lenses. The range of view of each lenslet is a conical shape radiating from the lens. Since the optics of each lenslet are known, the areas of overlap between all the lenslets in the array is also known. Using this information, the system can identify a position of an object with respect to the lens, for example, an object being captured within the image. Knowing the position of the objects, on X, Y, and Z axes in relation to the lens array and underlying sensor, the system is able to provide additional functions that are not possible using conventional techniques, as described further herein.

Figure 1:
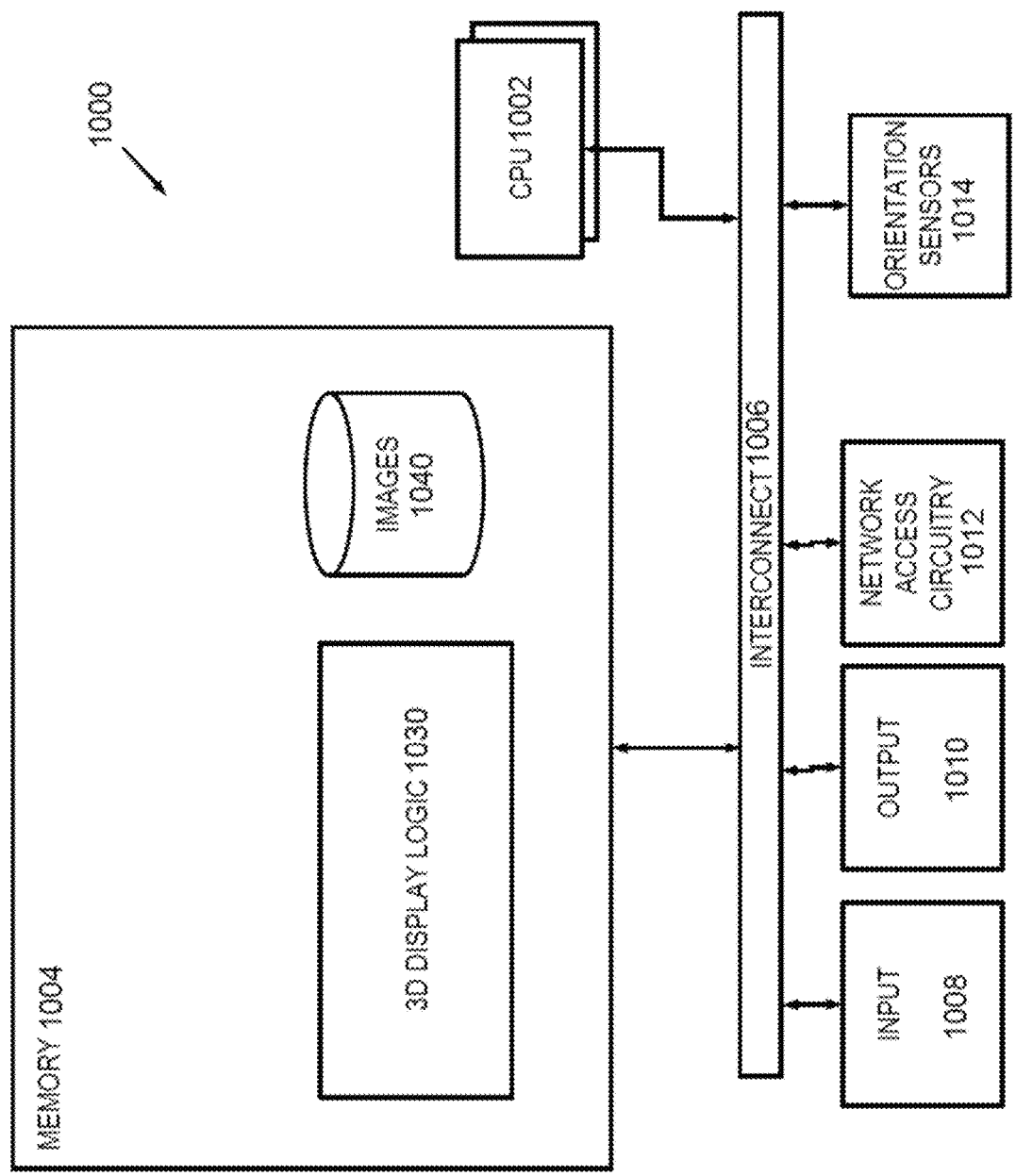
FIG. 1 illustrates a block diagram showing an example apparatus device.

Referring to FIG. 1, a device 1000, for example, that which is used for the viewing apparatus, is described. The device 1000 includes one or more microprocessors 1002 (collectively referred to as CPU 1002) that retrieve data and/or instructions from memory 1004 and execute retrieved instructions in a conventional manner. Memory 1004 can include any tangible computer readable media, e.g., persistent memory such as magnetic and/or optical disks, ROM, and PROM and volatile memory such as RAM.

CPU 1002 and memory 1004 are connected to one another through a conventional interconnect 1006, which is a bus in this illustrative embodiment and which connects CPU 1002 and memory 1004 to one or more input devices 1008 and/or output devices 1010, network access circuitry 1012, and orientation sensors 1014. Input devices 1008 can include, for example, a keyboard, a keypad, a touch-sensitive screen, a mouse, and a microphone. An embodiment may include an input device such as a camera or photo-sensor used for eye-tracking. Eye tracking that is then associated with computer-activation of particularly chosen pixels is a typical implementation of the invention when used in a near-eye display and other embodiments, as volumetric capture makes for more accurate tracking of eye movements. Output devices 1010 can include a display—such as an OLED (organic light-emitting diode), a microLED, or liquid crystal display (LCD), or a printed image of sufficiently high resolution—and one or more loudspeakers. Network access circuitry 1012 sends and receives data through computer networks. Orientation sensors 1014 measure orientation of the device 1000 in three dimensions and report measured orientation through interconnect 1006 to CPU 1002. These orientation sensors may include, for example, an accelerometer, gyroscope, and the like, and may be used in identifying the position of the user. Additional details regarding using multiple cameras and using triangulation to create 3D imagery can be found in commonly owned U.S. patent application Ser. No. 12/901,477, filed on Oct. 8, 2010, and titled "Three-Dimensional Video Production System", the contents of which are incorporated by reference herein. With reference to this application, the system described herein can use multiple cameras with Foveal lens systems to triangulate with an infinite number of potential data points among the multiple cameras.

Information handling device circuitry, as for example outlined in FIG. 1, may be used in image capture devices such as video cameras, digital still-image cameras, analog cameras, or other cameras having lenses, or devices that may be utilized to process images such as tablets, smart phones, personal computer devices generally, and/or other electronic devices.

Figure 2:
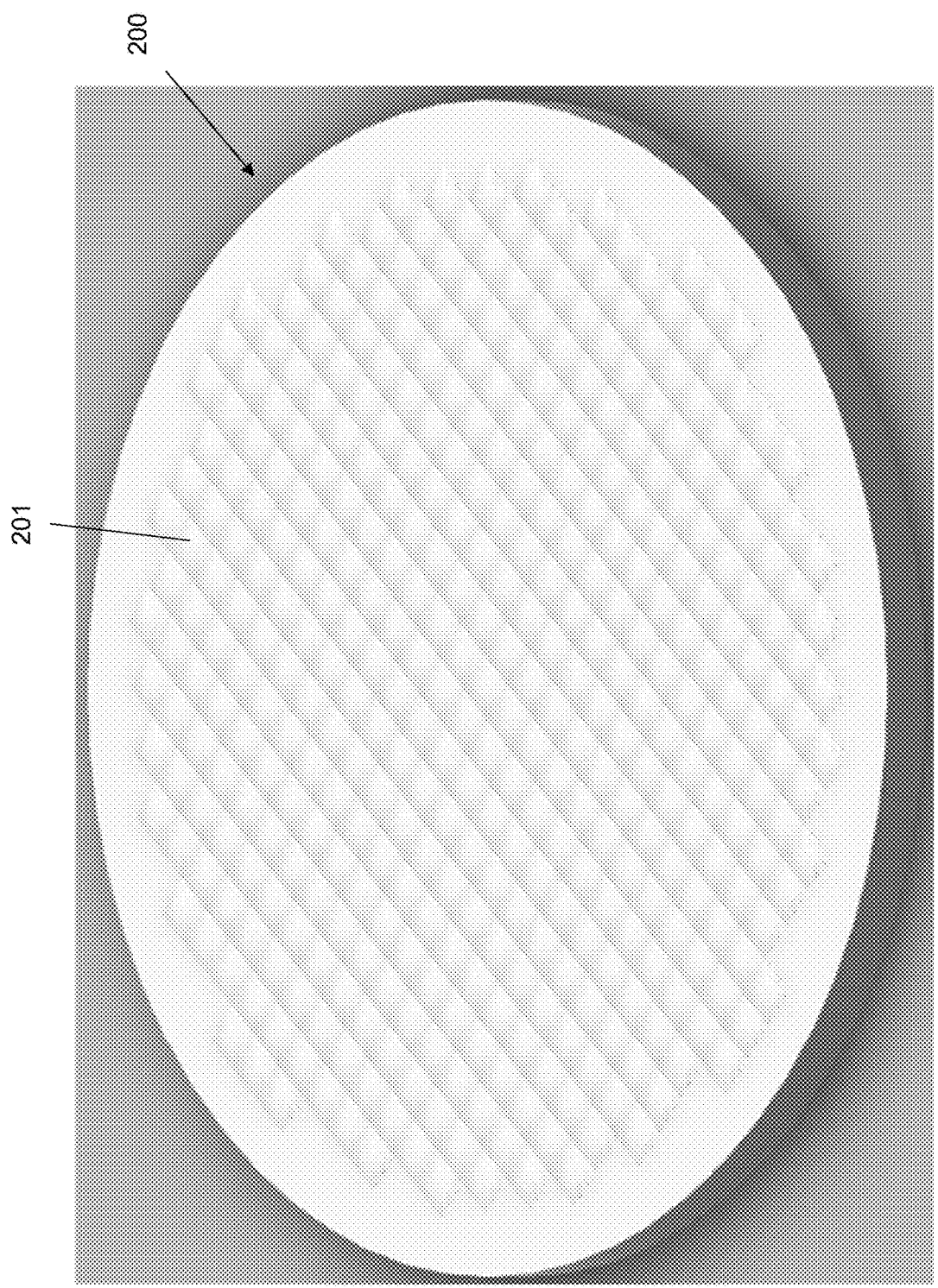
FIG. 2 illustrates an example image capture device lens design.

FIG. 2 illustrates an example lens 200 for an image capture device. It should be understood that while this lens is illustrated and will be discussed as a lens that can be added, as another other lens is, to an image capture device, for example, similar to how lenses are added to SLR cameras, it should also be understood that the lens may be integral to the image capture device. For example, the described lens may replace or complement a conventional lens of a portable information handling device. Some image capture devices allow choice among different lenses and, thus, require the addition of a lens of the user's choice to capture an image. The lens is coupled to the image capture device utilizing mechanical coupling, for example, grooves and followers, locks, or the like. This allows for easily changing lenses on the camera body. The lenses may also include threads at the end of the lens opposite the camera body. These threads are typically used to add filters, protectors, or other components to the lens.

The lens 200 is placed over at least one sensor, for example, an imaging sensor, of the image capture device. The sensor has an imaging plane that allows for capturing of images. The sensor may be a single sensor or an array of sensors. The number of sensors will be dictated by the desired overall image resolution to be used in the image capture device. In other words, the lens illustrated in FIG. 2 may either be included as a stand-alone lens that can be coupled to the camera body or may be designed as a filter-type lens that is added to the end of a lens that is coupled to the camera body.

The lens is referred to a Foveal lens and includes a plurality of lenslets 201. In the example of FIG. 2, the lenslets 201 are arranged in a matrix format across the face of the lens 200. The arrangement of the lenslets within the lens can be any arrangement and is not limited to the format illustrated in FIG. 2. For example, rather than being in-line, the lenslets may be arranged in a brick-like arrangement, circular arrangement, an alternating arrangement, or the like. There may be advantages of one arrangement over another arrangement. The lens 201 may be incorporated into a lens mount or mounting apparatus that allows the lens to be mounted onto an image capture device. Alternatively, the lens 201 may be incorporated into a component that allows for the incorporation of the lens into a camera body or an integral image capture device.

Figure 3A:
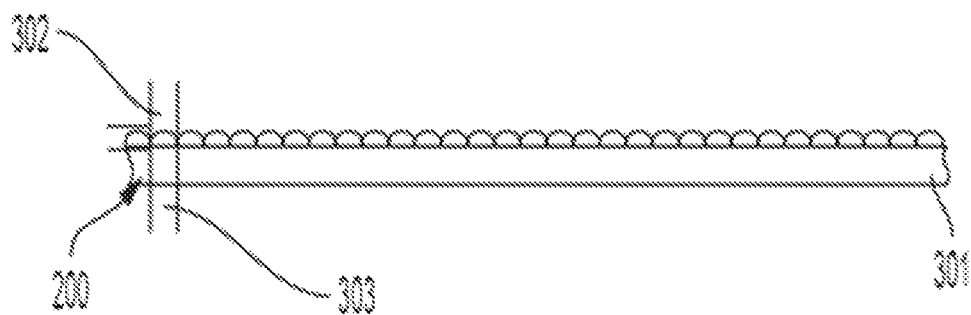
FIG. 3A illustrates a side view of an image capture device lens design.

FIG. 3A illustrates a side view of the lens 200. FIG. 3 includes some dimensions, as will be discussed further herein. However, it should be noted that these dimensions are for illustrative purposes only, as different dimensions may be utilized and still be within the scope of this application. The overall diameter of the lens may be 2 inches. However, this dimension may be modified based upon the specifications of the image capture device, or array of devices, that the lens is being coupled to. For example, different sensors are of different lengths and widths, necessitating different lens dimensions. The front surface of the lens may be anywhere from a few microns to several millimeters from the back surface.

As seen from FIG. 3A, the lens 200, has two main layers 301 and 302. Each of these layers could be manufactured utilizing layers. However, for purposes of this discussion we will treat each of layer 301 and 302 as a single layer, regardless of how these are actually manufactured and it should be understood that whether each of the layers are manufactured as a single piece or as layers does not deviate from the scope of this application. The base layer 301 of the lens 200 may be used as a base layer for laying or adhering the lenslet layer 302. Additionally, the base layer may provide some traditional lens features that are necessary for image capture; it may be the front or back surface of a traditional multiple-element lens meant to magnify an image. In the example of FIG. 3, the base layer 301 is 2 mm thick. This dimension does not include the lens sagitta.

The lenslet layer 302 is made of a plurality of light-directing lenslets that are arranged, for example, as discussed above. The shape of the lenslet can be spherical or aspheric, but will usually be spherical. That lens shape may be inscribed within tiles that are, hexagonal, square, triangular, etc., in order to place each lenslet in the array closer to other lenslets. The spherical (or, sometimes, aspherical) perspective shape of the lenslet may be shaved on its sides to fit the maximum lens chord diameter within the tile. Each of the disclosed lenslet shapes may have a different refractive index in different embodiments. Each of the lenslets may have a diameter, for example, a maximum diameter of 3 mm and a minimum diameter that is sufficiently large so as not to entail a noticeable amount of diffraction. Each lenslet is designed so as to focus an integral image on the sensor's image plane and presenting that image at infinity. In the example of FIG. 3, a tile section of the base layer 301 and corresponding lenslet 302 is 2 mm in width.

Figure 3B:
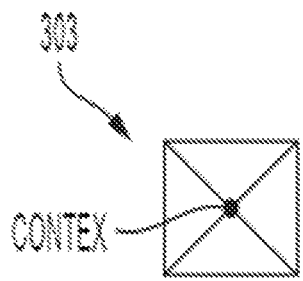
FIG. 3B illustrates a surface view of a section of an image capture device lens design.
Figure 3C:
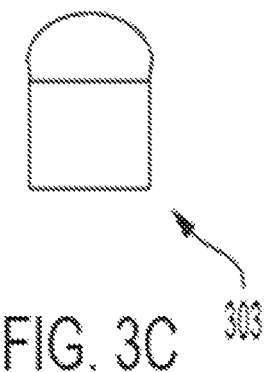
FIG. 3C illustrates a side view of a section of an image capture device lens design.
Figure 4A:
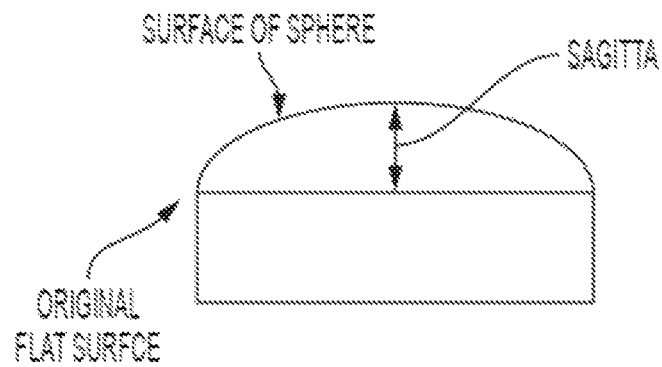
FIG. 4A illustrates a side view of a lenslet of the lens.
Figure 4B:
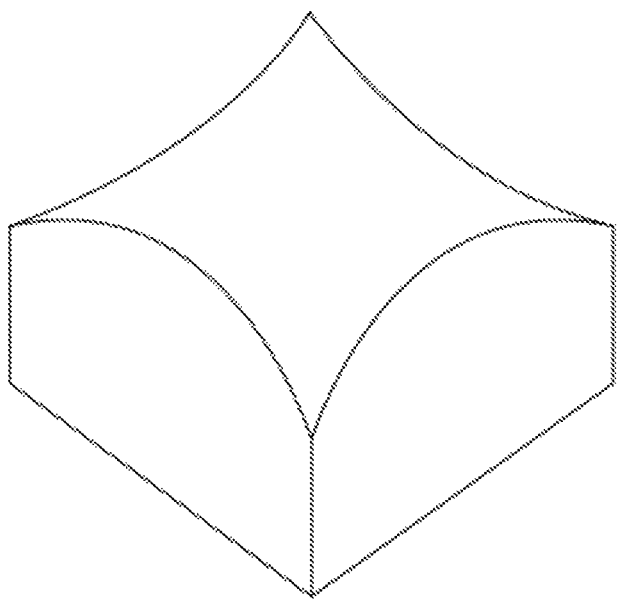
FIG. 4B illustrates a corner view of a lenslet of the lens.

A surface view FIG. 3B of the section 303 illustrates that the lenslet is an inscribed sphere having a center. FIG. 3C illustrates a side view of the section 303 where the lens saggita is 25 microns in thickness at from the highest point (e.g., the center) to the base layer 301. The thickness of the base layer 301 is 2 mm. In the example of FIG. 3, the radius of each lenslet is 45.4 mm. FIG. 4A illustrates a blow-up view of the side view illustrated in FIG. 3C. FIG. 4B illustrates a corner view of one of the sections 303.

Each layer of the lens 200 may be manufactured from a material, for example, plastic, glass, or the like. The material chosen may be based upon preferred specifications for the lenses, for example, a preferred focal length (although this can be modified as discussed further herein), preferred index of refraction, or the like. These specifications may provide for different preferred advantages, for example, image plane focus distances, or the like. Additionally, with the addition of the lenslets, the specifications for the lens may be increased. For example, either the lenslets and/or the base layer may be made of different materials with either higher or lower indices of refraction, in order to capture different wavelengths of light or to match a given focal distance to the sensor.

Additionally, in creating the lenslets, other components may be added to the lenslets, for example, specialized additives, such as are commonly used in retroreflective beads, or by placing the lens array around, or in front and/or back of a material with high refractive index such as a cholesteric liquid crystal cell, higher refractive indices could be achieved. As should be understood by one skilled in the art, these examples of materials with high refractive indices are merely examples and are not meant to be limiting as other materials or combination of materials to achieve a high refractive index are possible and contemplated. Additionally, other benefits may be achieved, for example, ultraviolet (UV) filtering, anti-reflective coating, color skewing, or the like. These are benefits that may be achieved utilizing other filters that can be added to the end of the lens. Thus, by including these features within the described lens, an additional filter would not need to be added. However, the lens may also include threads that would allow for the addition of a filter, as with traditional filter lenses. Alternatively, the described lens can replace portions of the camera body or camera components as the described lens could fit directly over the sensor or sensor array of the image capture device. Thus, the described lens could be utilized in devices having only a sensor, the lens itself, and minimal other components; all or some portion of the required processing and data storage might be located remotely.

The processor of the image capture device or information handling device housing the image capture device can cause the image capture device to capture an image through the lens. Utilizing the described lens, the system captures individual images from each of the lenslets. The image captured by a lenslet may be a portion of an overall image. Each image captured by each lenslet is in a full focus at infinity, thereby generating an integral image at full focus for each lenslet. The only limitations in resolution are the manufactured accuracy of the lens to the specification and the number of photosites used under each lenslet. The number of photosites per lenslet is determined by the resolution of the sensor or sensor array of the image capture device, and the size of each lenslet.

The integral image for each lenslet represents the full range of view of the corresponding lenslet. This range of view is determined by the defining optics of the lens. Thus, for any given lens design the range of view of each lenslet will be a cone radiating out into space from the lens. In other words, the cone will originate at the lenslet and be directed away from the image capture device. The cone is produced due to the shape of the lenslet. Thus, as the distance from the lenslet increases, the diameter of the cone increases. Accordingly, the cones from neighboring lenslets will overlap.

These conical areas of overlap are predictable and are able to be mathematically determined. Knowing the areas of overlap and the optics of the lenses, the system can determine the position of objects with respect to the image capture device, or, more specifically, to a lenslet. In other words, the distance of an object from the image capture device can be determined and identified.

Determining the position of an object can be completed using mathematical calculations, for example, trigonometry. The spatial area covered by each lenslet can be understood to be a set of coordinates, X, Y, and Z, in space. Thus, since multiple lenslets capture a single area in space, due to the overlap, and each area in space has a known set of coordinates in the X and Y direction, utilizing triangulation from each photosite that is capturing a particular portion of the image, the Z coordinate can be determined. The distance from the lens to any point in space can be known, in fact, even if no object is present at that point. While other, conventional systems, can do volumetric capture, the volumetric capture of the conventional systems is performed utilizing two or more cameras triangulating from each of the viewpoints of the cameras on the object. Alternatively, tags can be placed on objects with geoposition sensors and radios to register the data. The described application, instead of only have a finite number of triangulated data points or tags which have to be previously positioned on objects, can have an infinite number of potential triangulated data points corresponding to any spatial location within the image and does not require the pre-planning of the tagging.

Thus, since distances to the lens within an overall image can be determined, the user can provide input so that only portions of the overall image are actually captured. For example, if the user wants to focus on a particular distance from the lens similar to a zoom function or a focus-point function of a traditional image capture device, the user can provide this information to the system. The system can choose all information captured by or seen by any lenslets or photosites that corresponds to the specified distance and then ignore or reject all other information or the information corresponding to other distances. The resulting image will be an image, the totality of which is seen at full focus, of just the matter or objects seen at the given or selected distance. Similarly, the user can select a range of distances, and the system can create an image of the matter or objects at the range of distances, thereby having an image with a greater depth of field, or an image showing multiple planes in focus without the information between the planes that would normally be seen. When software employing edge detection and other forms of object recognition, as is well understood by those familiar with the art, is deployed in combination with the lens's ability to precisely locate point in space due to its vast number of intersecting data points, objects may be precisely mapped and then their volumetric image may be processed and manipulated by additional software.

The user can also select other image capture device parameters that would result in different overall data that is captured to generate an image. This selection would result in images that create the same effect as different types of lenses that can be installed on traditional image capture devices without actually having to change the lens. For example, changing the parameters and, therefore, changing the data that is captured, the resulting image can appear to have been captured with longer or shorter focal lengths, less or more depth of field, or the like. Similarly, sets of data can be selected to make it appear that the user used a pan, tilt, or zoom function, without the user actually having to use a mechanical system to change the pan, tilt, or zoom as in conventional "PTZ" camera rigs.

The image capture parameters may be used during the capture of the image, or since so much information can be captured with the image, during an editing of the image. Thus, the processing and analyzing of the image and application of different image parameters can be done locally on the image capture device or an information handling device housing the image capture device, or remotely at a different information handling device. Accordingly, the user may choose to capture the desired image or may edit the capture image to result in the desired image.

Figure 5:
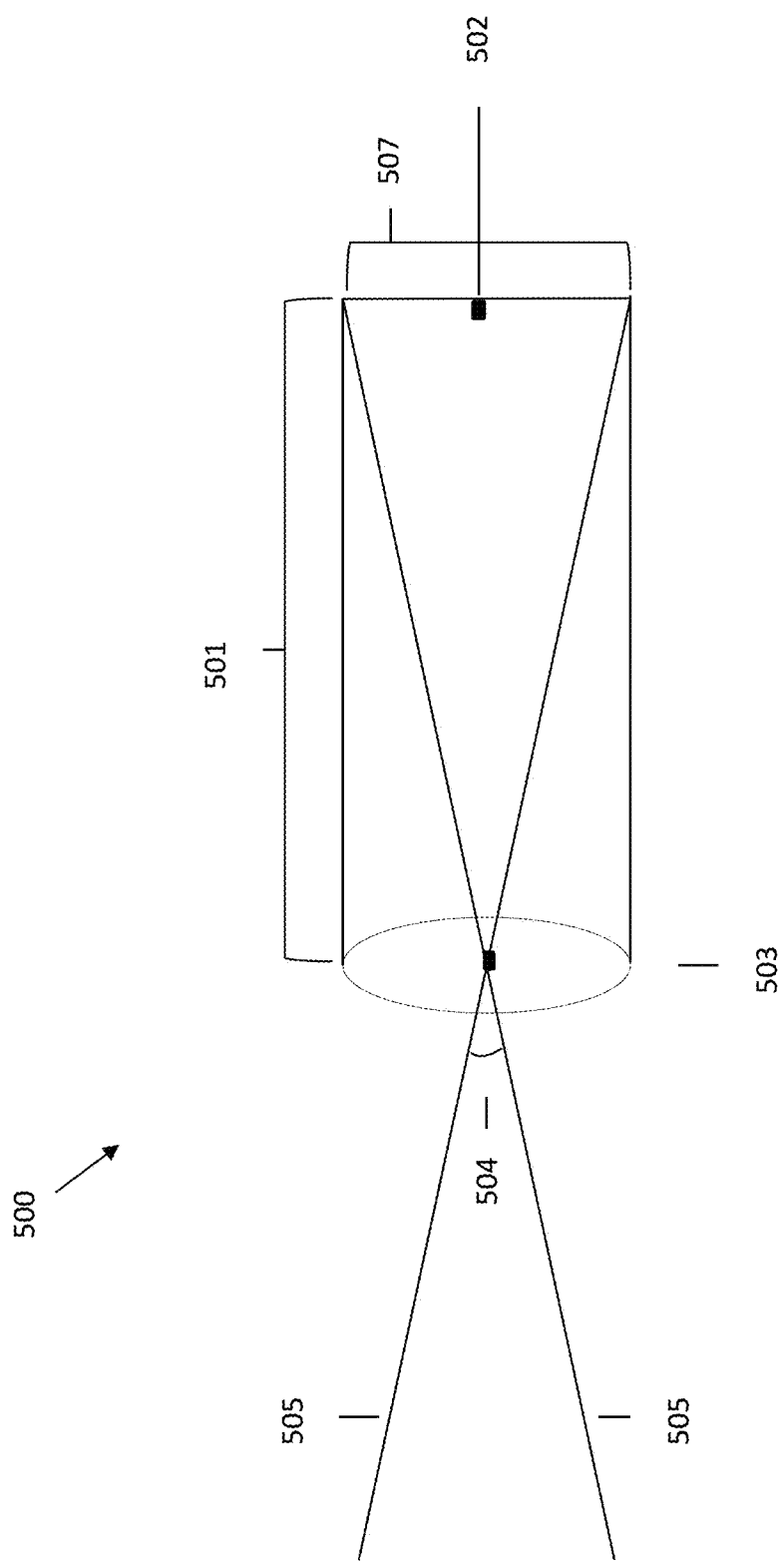
FIG. 5 illustrates an example structural diagram showing a detailed side view of a portion of the lenslet array.

FIG. 5 illustrates a view of the lenslet 500. Orientation of the lenses may result in the lenslets having overlapping conical shapes with neighboring lenslets, thereby capturing an integral image 502 having a portion that overlaps with a portion of the integral image captured by a neighboring lenslet. A precise angle of the lenslet 504 may be calculated to determine an instance where viewing a section of a captured image 502 will only occur through a single lenslet 503; thus, resulting in a clear view on the overall image and an overall improvement of the efficiency of the display. This angle may be calculated by:

$$A = 2\tan\left(\frac{S}{2L}\right)$$

where A is the full angle of the image of the lenslet 504, S is the diameter of the lenslet 507, and L is the focal length 501. This equation may produce an angular value in radians. The center of the integral image 502 captured by the lenslet must be the angle at which the lenslet 503 is pointed. The image at the top of the rear must be the image on the master image that is at an angle A/2 about that. The point at the center of the image of the next lens over, whether the next lens to the right or left, or up or down in the array, is determined by the angular distance of the center of that lens from the center of the original lenslet 503. This information may then be used, as discussed above, to select subsets of information within the overall image.

Figure 6:
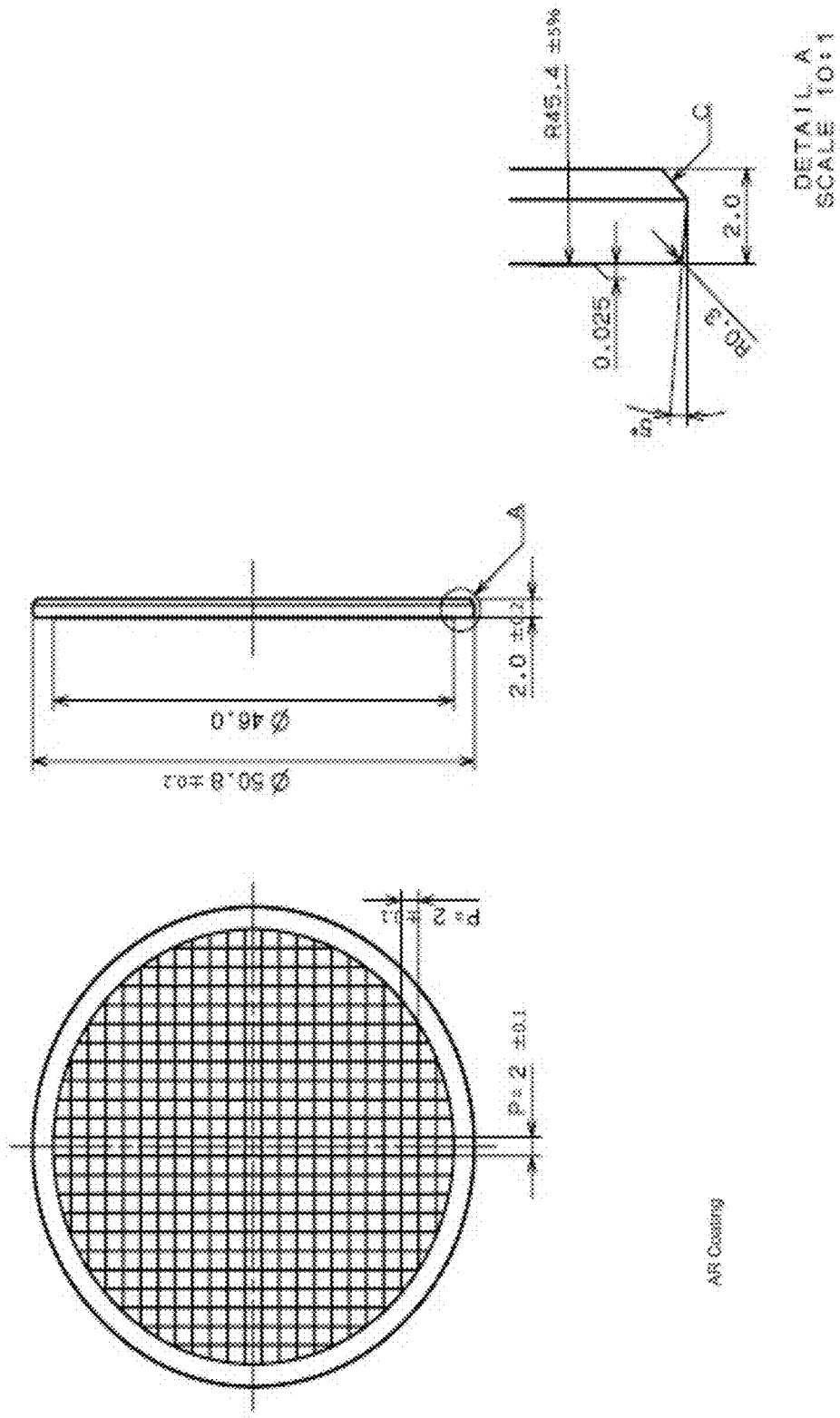
FIG. 6 illustrates an example prototype drawing.

FIG. 6 illustrates an example prototype of the plenoptic lens includes a top view, side view, and detailed view, including dimensions. It should be understood that this is merely illustrative and is not intended to limit the scope of this application to this configuration or these dimensions.

In the application, reference to "a processor" may control portions of the overall potential volumetric field captured by of the foveal lens device (and thus what appears to be its focus), control what is done with the captured information, control a plurality of integral images, control the interaction of the foveal lens with other components of the device, or any combination of processing performed by the device in part or in whole.

A number of components of the device 1000 are stored in memory 1004. In particular, 3D capture logic 1030 is all or part of one or more computer processes executing within CPU 1002 from memory 1004 in this illustrative embodiment but can also be implemented, in whole or in part, using digital logic circuitry. As used herein, "logic" refers to (i) logic implemented as computer instructions and/or data within one or more computer processes and/or (ii) logic implemented in electronic circuitry. Image 1040 is data representing one or more images and/or views which may be stored in memory 1004.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. An apparatus, comprising:
   at least one sensor having an imaging plane;
   a plurality of light-directing lenslets arranged as a plenoptic lens, wherein the plenoptic lens is located over the at least one sensor, wherein each of the plurality of light-directing lenslets focuses an image on the imaging plane of the at least one sensor and wherein the focusing comprises focusing, at infinity, an individual full focus image associated with each of the plurality of light-directing lenslets occupying a spatial position within the image onto the at least one sensor; and
   a processor operatively coupled to at least one sensor that causes the apparatus to capture the image through the plenoptic lens, wherein the captured image comprises a volumetric data set providing information related to the spatial positions within the image, wherein the volumetric data set captures light from known directions permitting a modifying of the information seen in the captured image.

2. The apparatus of claim 1, wherein the plenoptic lens is incorporated into a lens mount for mounting on the apparatus.

3. The apparatus of claim 1, wherein each of the plurality of light-directing lenslets has a range of view corresponding to a cone radiating from the corresponding lenslet.

4. The apparatus of claim 3, wherein the range of view of one lenslet overlaps with a range of view of a neighboring lenslet.

5. The apparatus of claim 1, wherein the image captured comprises an image having objects at a specified distance, wherein capturing objects at a specified distance comprises accepting image information captured by photosites of the at least one sensor seeing information corresponding to the specified distance and rejecting image information captured by photosites of the at least one sensor seeing information corresponding to distances other than the specified distance.

6. The apparatus of claim 1, comprising modifying the focal length represented within the image by selecting a subset of the image information captured by photosites of the at least one sensor.

7. The apparatus of claim 1, comprising modifying the depth of field represented within the image by selecting a subset of the image information captured by photosites of the at least one sensor.

8. The apparatus of claim 1, comprising modifying a degree of at least one of: pan and tilt represented within the image by selecting a subset of the image information captured by photosites of the at least one sensor.

9. The apparatus of claim 1, wherein modifying information utilized to generate the image is performed at a remote data processing location.

10. An image capture device, comprising:
    at least one imaging sensor within the image captured device and having an imaging plane;
    a plurality of light-directing lenslets arranged as a lens, wherein the lens is located over the at least one sensor and coupled to the image capture device, wherein each of the plurality of light-directing lenslets focuses an image on the imaging plane of the at least one sensor and wherein the focusing comprises focusing, at infinity, an individual full focus image associated with each of the plurality of light-directing lenslets occupying a spatial position within the image onto the at least one sensor; and
    a processor operatively coupled to at least one sensor that causes the image capture device to capture the image through the lens, the processor processing information contained within the image, wherein the captured image comprises a volumetric data set providing information related to the spatial positions within the image, wherein the volumetric data set captures light from known directions permitting a modifying of the information seen in the captured image.

11. The image capture device of claim 10, wherein the lens is incorporated into a lens mount for mounting on the image capture device.

12. The image capture device of claim 10, wherein each of the plurality of light-directing lenslets has a range of view corresponding to a cone radiating from the corresponding lenslet.

13. The image capture device of claim 12, wherein the range of view of one lenslet overlaps with a range of view of a neighboring lenslet.

14. The image capture device of claim 10, wherein the image captured comprises an image having objects at a specified distance, wherein capturing objects at a specified distance comprises accepting image information captured by photosites of the at least one sensor seeing information corresponding to the specified distance and rejecting image information captured by photosites of the at least one sensor seeing information corresponding to distances other than the specified distance.

15. The image capture device of claim 10, comprising modifying the focal length represented within the image by selecting a subset of the image information captured by photosites of the at least one sensor.

16. The image capture device of claim 10, comprising modifying the depth of field represented within the image by selecting a subset of the image information captured by photosites of the at least one sensor.

17. The image capture device of claim 10, comprising modifying a degree of at least one of: pan and tilt represented within the image by selecting a subset of the image information captured by photosites of the at least one sensor.

18. The image capture device of claim 10, wherein modifying information utilized to generate the image is performed at a remote data processing location.

* * * * *